Nov. 23, 1965   C. W. EPPERLEY   3,219,073
CUTTING HEAD
Original Filed Nov. 8, 1961   2 Sheets-Sheet 1
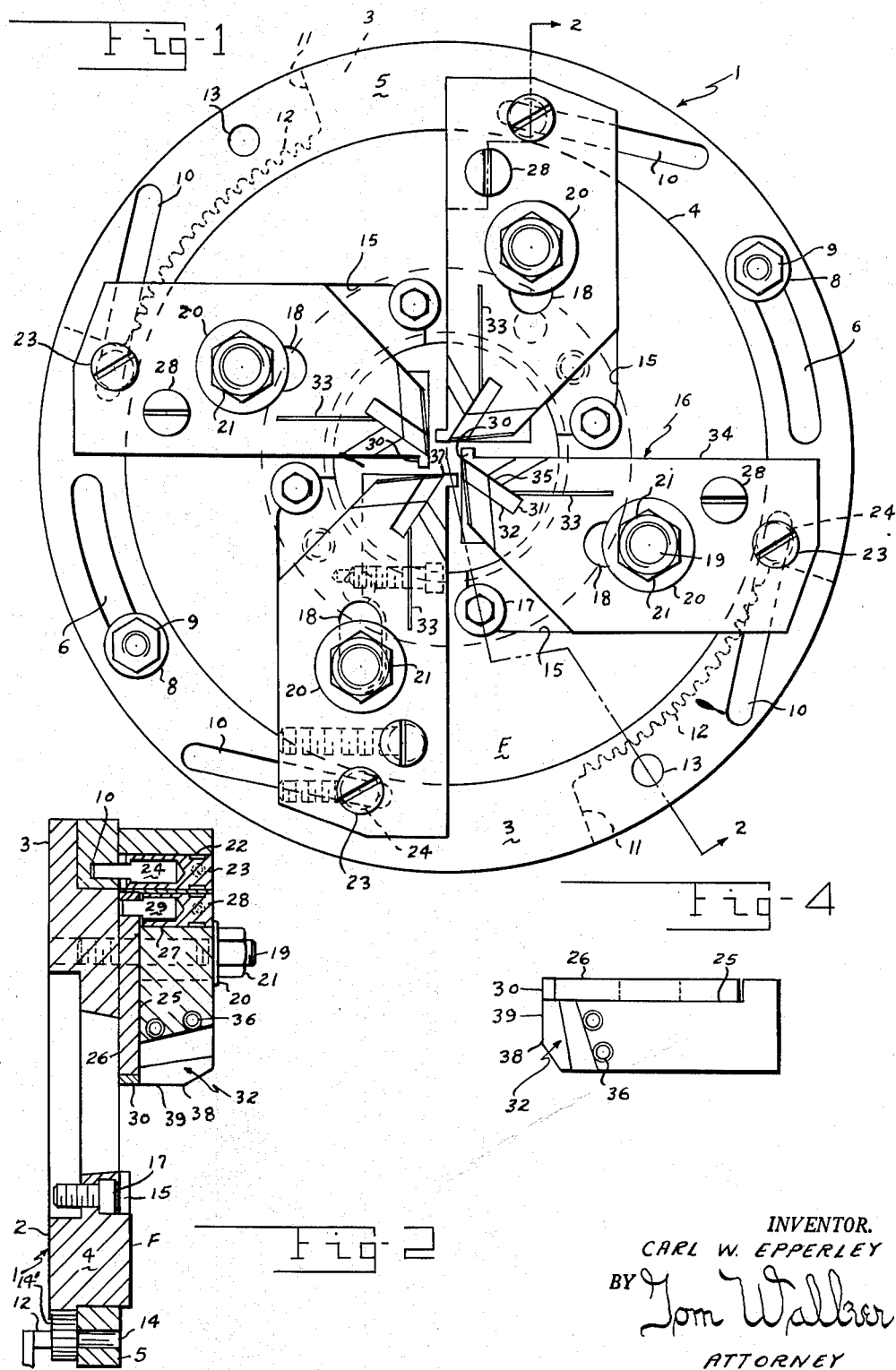
INVENTOR.
CARL W. EPPERLEY
BY Tom Walker
ATTORNEY

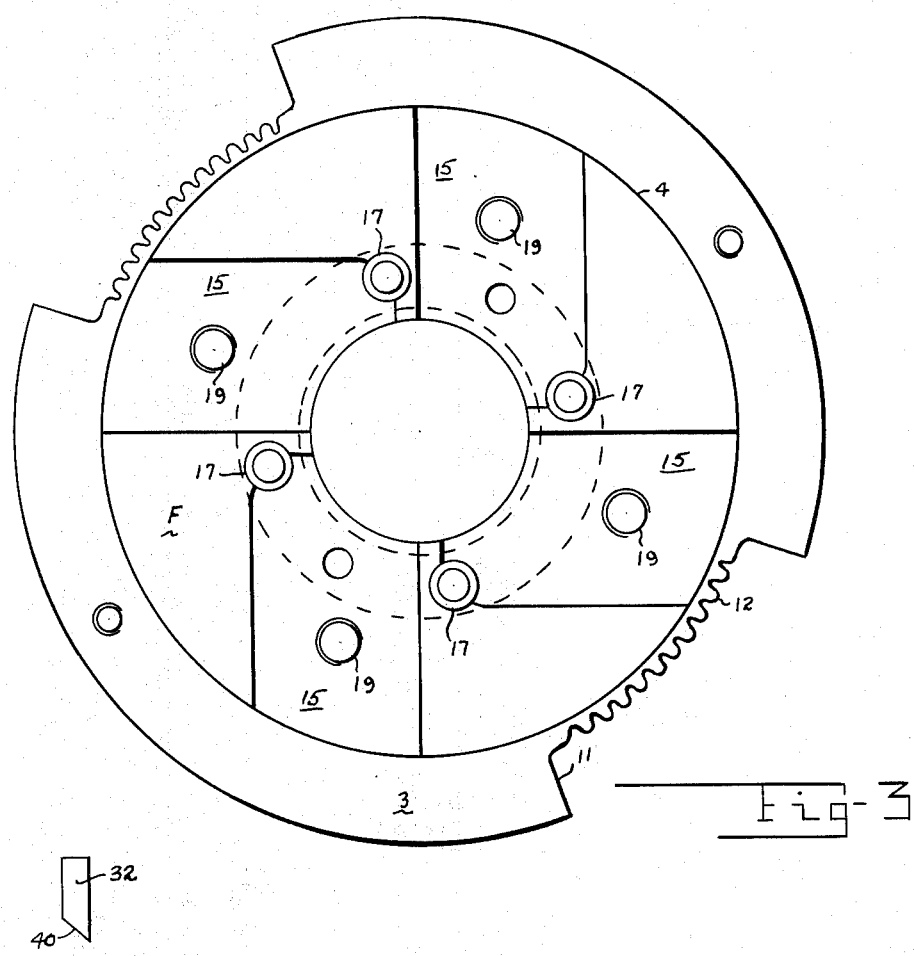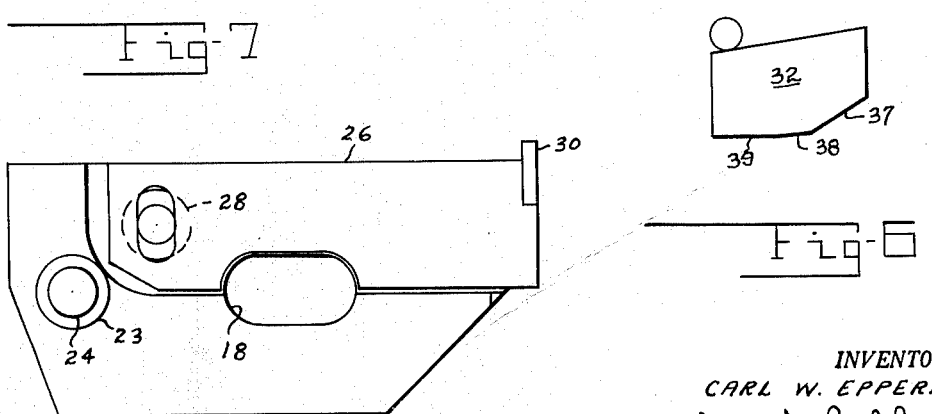

3,219,073
CUTTING HEAD
Carl W. Epperley, Dayton, Ohio, assignor to The East Dayton Tool & Die Company, Dayton, Ohio, a corporation of Ohio
Continuation of application Ser. No. 151,068, Nov. 8, 1961. This application Mar. 4, 1965, Ser. No. 438,831
6 Claims. (Cl. 142—31)

This application is a continuation of application Serial No. 151,068, filed November 8, 1961, for Cutting Head.

This invention relates to cutting heads which are particularly advantageous in application to dowel machines and will be so described. It is to be understood, however, that neither the form of its embodiments nor its application is intended to be so limited thereby.

The cutting head in a conventional dowel machine revolves around the work piece or stock. The stock is fed to and through the revolving head which mounts a cutter set tangent to the top center of the turned diameter. This produces a skiving cut. With this type of cutting action a clearance angle cannot be employed. The results are a rapid dulling of the cutter, producing a condition where the cutter is forced away from the stock. As this occurs, accuracy is lost and the turned diameter will inherently increase. A further consequence is that the dulled cutter will produce a drag on the stock, compounding the force necessary to both feed the stock and revolve the cutter. Due to the above, dowel machines are plagued with a large percentage of down time which is normally used to adjust and replace cutters. As a matter of fact, the nature of the conventional cutting heads is such that their cutters are difficult to readily position with any degree of precision. Further, the feed of stock, per se, has produced vibration problems in the conventional machine which affects its accuracy. Thus, the efficiency and precision characteristics of the prior art dowel machine leaves much to be desired.

The present invention not only provides improvements in cutting heads, per se, but also enables a solution of the problems above enumerated with reference to dowel machines. Among other advantageous features, it provides a cutting head employing a plurality of cutters capable of simultaneously providing a plurality of equidistantly spaced radial cuts on stock fed therebetween, in effect producing a helical shearing of the stock rather than a skiving cut and the problems it entails. Moreover, means are provided for readily and finely adjusting the cutters to effect an optimum concentricity thereof with respect to the stock being worked. Invention embodiments also include improved tool holders incorporating means for defining the turned diameter of stock capable of inhibiting stock vibration as it is worked. The tool holders are so mounted as to be capable of infinite adjustment within the capacity of the head to which they are applied.

A prime feature of the invention is a novel cutter element which produces a staged cutting action. This cutter and its holder are so designed to facilitate ready adjustment or replacement without loss of precision or effectiveness.

A primary object of the invention is to provide a cutting head which is economical to fabricate, more efficient and satisfactory in use, adaptable to a wide variety of applications and unlikely to malfunction.

Another object of the invention is to provide an improved cutting head particularly applicable to dowel machines.

A further object of the invention is to provide a cutting head for shaping dowel type stock incorporating means for inhibiting vibration of the stock while it is being worked.

Another object of the invention is to provide a cutter head including a novelly mounted tool holder capable of infinite adjustment within its defined limits.

An additional object of the invention is to provide an improved cutting head mounting a plurality of cutters arranged to simultaneously apply a series of equidistantly spaced substantially radial cuts to stock passed therebetween to thereby produce a precision shearing of the stock.

A further object of the invention is to provide an improved cutter element particularly advantageous in application to dowel machines.

Another object of the invention is to provide an improved cutter and holder therefor so related as to facilitate adjustment and replacement of the cutter with no loss of the established position of the cutter.

A further object of the invention is to provide an improved cutting head incorporating means for readily establishing a plurality of cutters thereon to define a perfect concentricity thereof about a central axis therebetween.

An additional object of the invention is to provide improved means enabling an effective precision operation on dowel material with down time held to a minimum.

A further object of the invention is to provide a cutting head possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

FIG. 1 is a plan view of the operating or entrance face of a cutting head in accordance with the invention;

FIG. 2 is a cross-sectional view taken on line 2—2 of FIG. 1;

FIG. 3 is a plan view of the mounting plate embodied in the apparatus of FIG. 1;

FIG. 4 (sheet one) is a plan view of the top of the tool holder employed in the apparatus of FIG. 1;

FIG. 5 is a view of the exit side of the tool holder showing the novel association of a guide or wear plate therewith;

FIG. 6 is a plan view of an improved cutter as provided by the invention; and

FIG. 7 is an end view of the cutter of FIG. 6.

Like parts are indicated by similar characters of reference throughout the several views.

The invention can be best described with particular reference to the accompanying drawings wherein a cutting head is shown which is particularly applicable to a dowel machine. The head 1 includes centrally apertured base plate 2 having a generally tubular configuration and including an external flange 3 to one end. The portion of the plate 2 which projects forwardly of the flange 3 provides a tubular hub 4 serving as a bearing for a ring 5. The ring 5 is coextensive with the flange 3 and includes a pair of identical diametrically opposite, arcuate slots 6. A pair of studs 7 respectively project through the slots 6 to threadedly engage in the flange 3 at positions 180° apart. The studs 7 serve as limit means providing for relative circular adjustment of the ring 5 about the hub 4 to the extent defined by the limits of the slots 6. A washer 8 and nut 9 is provided about each stud 7 at the outer face of the ring 5 by means of which the ring may be clamped in a selected position of adjustment with reference to the flange 3. The ring 5 also has four equidistantly spaced identical slots 10 therein which are of a straight line character. The slots 10 are identically angled to extend from adjacent the outer periphery of ring 5 to one end to adjacent the inner periphery thereof to their opposite end.

The flange 3 is uniformly recessed at diametrically opposite portions 11 of its outer periphery. The innermost surfaces of the recesses so defined are formed to provide arcuate racks 12 which are in circular alignment. Apertures 13 in the ring 5, positioned 180° apart, are arranged to respectively overlie one of the recesses 11. A crank pin 14 mounting a pinion 14' is insertable in a recess 11 to extend through an aperture 13 and provide intermeshing engagement of the pinion with an adjacent rack 12. On rotation of the pins 14 the ring can thereby be rotated about the hub 4, provided the nuts 9 are loosened to free the ring.

In a dowel machine, the plate 2 is adapted to be fixed by bolts 17 over one end of a revolvable tubular spindle (not shown), coaxial therewith to dispose its flanged end in abutment with the spindle. The face F of the hub 4, which is relatively projected extends beyond the ring 5 and has four identical grooves 15 therein. The grooves 15 are equidistantly spaced, adjacent grooves being at right angles to each other. The outermost ends of the grooves 15 open at the outer periphery of the hub while a portion of their innermost ends open at its inner periphery. Each of the grooves have a depth equal to the projection of hub 4 beyond ring 5 and their sides, which extend from the outer to the inner periphery of the hub, are parallel.

A generally rectangular tool holder 16 seats in each groove 15. The holders project equally from and perpendicular to the face F. For purposes of convenience, the tool holders will be described with reference to their orientation as shown in FIG. 1, contemplating a counter-clockwise revolution thereof with the plate 2. Specifically, the tool holder referred to for purposes of illustration will be that shown in a horizontal position and to the right hand of the cutting head as illustrated in FIG. 1.

An elongated aperture 18 centrally of each tool holder 16 and oriented on its longitudinal axis serves to receive a stud 19 which is threadedly engaged in the base. A washer 20 and nut 21 on the projected extremity of each stud 19 releasably confines the respective tool holder associated therewith in its groove 15. The studs 19 thereby adapt the holders 16 for adjustment in the grooves 15 to the extent of the slots or apertures 18.

As mounted, each tool holder 16 has an aperture 22 therein at its outer end which is positioned beyond and adjacent the outer periphery of hub 4. This aperture 22 contains an eccentric bushing 23 having a slotted head at the outermost surface of the tool holder. A pin 24 frictionally contained in the inner end of the bushing 23 projects from the innermost face of the tool holder into a slot 10 in the ring 5. The portion of the pin 24 within the slot has flats to opposite sides whereby it is immediately confined for straight line movement in the slot in a manner to be described.

At the innermost side and to the inner end of each holder 16, at its upper edge, is a rectangular recess 25. The recess 25 nests a bar which substantially fills the recess to provide a guide or bar 26. An aperture 27 through each tool holder parallel to and adjacent its aperture 22 accommodates eccentric bushing 28 having a slotted head at the outermost face of the tool holder. A pin 29, frictionally engaged within bushing 28, projects from the inner end thereof and has a flatted portion which projects through a slot in one end of the bar 26. The other end of bar 26 extends to the inner extremity of the associated holder 16 adjacent the central axis of the plate 2. At their ends adjacent the central axis, the bars 26 have planar wear surfaces 30 which are shaped and oriented to form a square throat, the center of which corresponds to said central axis. Turning of the eccentric bushing elements 28 in the respective tool holders about the pins 29 will provide a relative axial adjustment of the bars 26 relative the holders 16.

Set screws are associated with each of the eccentric bushings for fixing them in selected positions of adjustment.

Viewing FIG. 1 of the drawings, the holder 16 has a groove 31 directed inwardly of its end most adjacent the central axis of plate 2 and angled downwardly from its uppermost surface to accommodate a cutter 32. The one side of the groove 31 opens to and terminates at the recess nesting bar 26. Looking down from the top, the base of the groove 31 is angled obtusely with reference to the end defined by the bar 26 as is the base of the cutter 32. The holder 16 also has a slot 33 parallel to its uppermost surface 34 which opens into the uppermost surface 35 of the groove 31. Screws 36 engaged in the body of the holder 16 bridge slot 33 and may be conventionally adjusted to clamp the cutter 32 in a manner believed obvious.

As may be observed from the drawings, the cutting edges of the respective cutters 32 are identical, their entrance portions 37 being sharply angled, their intermediate portions 38 being less sharply angled and their exit portions 39 being on a 180° angle. The portions 39 have cutting edges co-planar with the adjacent surfaces 30 of bars 26 forming the rectangular throat referred to previously, which surfaces are at right angles to the adjacent extremities of the cutter bodies.

Referring to FIG. 1 of the drawings, it may be seen that the respective cutters 32 are oriented to effect substantially radial cuts mutually referenced to stock which may be passed therebetween. Each tool holder 16 to its innermost end adjacent the central axis of the cutting head has end faces which are sloped away with reference to the undersurface of the cutter element mounted thereto so that on relative rotation of the cutting head as stock is passed between the cutter elements shavings induced by a preceding cutter element will have sufficient clearance referenced to a succeeding cutter to avoid malfunction or undue load resulting therefrom. In addition, it is to be noted that each cutter element 32 has a surface 40 sloped from its cutting edge to provide a positive clearance angle, enabling an effective application of the cutter.

Thus, a cutting head in accordance with the invention has been described. Its use and application to a dowel machine is as follows: To set up a dowel machine, to handle a particular type stock to effect a particular turned diameter, the plate 2, as mentioned previously, is first mounted by bolts 17 to form an axial extension on one end of a removable spindle. Then, on loosening of the nuts 9 and insuring freedom of the tool holders 16 by proper positioning of the nuts 21, the ring 5 can be rotated on the hub 4 within the limits of the slots 6 by operation of pinions 14', to cause its portions defining slots 10 to conjointly set on the pins 24 depending from the bushings 23. This influences a neutral and simultaneous adjustment of the tool holders 16 to establish a predetermined positioning thereof in grooves 15 referenced to the central diameter of the plate 2. This positions the end surfaces 30 of the guide or bar 26 to mutually form a generally rectangular throat the dimensions of which are intended to define the turned diameter to which stock is to be worked. It is to be noted that with ring 5 clamped in position, independent precision adjustment of any one of the holders 16 in its groove 15 may be effected by rotation of its eccentric bushing 23. This provides for fine adjustment to a degree determined by the dimension of the bushing and the degree of rotation thereof and effects a selective movement of the holder inwardly or outwardly on the plate 2. In this manner the cutting edges of the cutters 32 may be precisely oriented to provide a perfect concentricity thereof about the central axis of the plate. In the event that some adjustment of the wear or guide plates 26 may be required, to effect a precision positioning thereof, the eccentric bushings 28 may be rotated on their pins 29 to thereby project or retract the guide plates relative the holders 16 in a manner believed obvious. It thus becomes obvious that the surfaces 30 of the plates 26 which are mutually adjacent can be positioned to define any turned diameter desired which is within the dimensional capacity of the cutting head provided. Similarly, the holders 16 may be positioned in their grooves 5 and finely adjusted to establish the cutting edges of the cutters 32 relatively concentric to the central axis of the plate 2.

In use of the cutting head, the spindle to which the head is attached is revolved to thereby revolve the head. As seen in FIG. 1 of the drawings, a counter-clockwise rotation of the head may be induced at which point stock to be worked is fed longitudinally of the cutting edges of the blades 32 through the central aperture in the plate 2. As the stock moves into the throat defined by the cutters the expanded portion thereof defined by the edge portions 37 provide four simultaneous substantially radial cuts which are deepened as the stock moves inwardly along the edge portions 37 and pass the edge portions 38 and 39 in succession. This, in effect, provides a staged cutting action and a continuous helical shearing of the stock to the turned diameter desired. As the stock leaves the edges 39 which determine the final turned diameter, it is confined precisely within the square throat established by the surfaces 30 on the guide plates 26. In this manner the stock is confined immediately of the blade 32 and stabilized thereby to prevent vibrational influence which would affect the working of the stock.

The nature of the cutting head, the holders and the blades as well as the improved mounting thereof is such to insure a precision working of dowel material. Moreover, shape of the cutters 32 and the relation thereof to the holders 16 as provided by the invention results in the cutters having an extended operating life. In addition, the particular shape of the base of the cutter and its mating relation to the sloped base of the groove in which it seats facilitates its removal, correction and replacement without loss of the precision positioning established therefor. For example, on removal of a blade and reducing its depth at its cutting edge to a degree equal to a reduction at its exit and replacing the blade so its modified exit end is at the end of the groove 31 adjacent the associated bar 26, it will assume the same cutting orientation as originally provided.

As above described, the invention provides a cutting head of an improved character having tool holders novelly mounted thereon including features enabling precision adjustment thereof. Efficiency and effectiveness of the machines to which the cutting head is applied is substantially increased and maintenance is minimized thereby. The staged cutting action provided by the blade elements enables a better product at minimum cost.

While the invention has been set forth herein with reference to dowel machines, it should be obvious that the features of the invention have other application and may assume other form. Such is believed within the scope of the present invention.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. In a tool for the peripheral reduction of axially fed doweling or like stock, said tool having a head; a blade holder mounted to said head, a blade mounted to said holder and having an elongated cutting edge differentially sloped from end to end thereof and disposed longitudinally of said head, the head and a work piece advancing relatively to one another with said cutting edge disposed longitudinally of the work in a plane radial to the axis thereof, one end of said edge being a trailing end with respect to the order of engagement of said edge with the work, and means on said holder extending transversely across said trailing end of said cutting edge, said means presenting a work engaging bearing surface in the plane of the trailing end of said edge.

2. A tool according to claim 1, characterized by a plurality of said blade holders and mounted blades, spaced apart angularly on said head to locate the cutting edges in respectively different planes radial to the longitudinal work axis, the said last named means of said several holders cooperating to form an exit throat defining the turned diameter of the work.

3. In a tool for the peripheral reduction of axially fed doweling or like stock, said tool having a head; a blade holder mounted to said head, a blade mounted to said holder and having a differentially sloped cutting edge of longitudinal extent in a plane substantially radial to said head, and means on said holder defining a work engaging bearing surface extending transversely across the trailing end of said cutting edge at one end thereof and co-planar therewith at said trailing end.

4. A tool according to claim 3, characterized in that an eccentric bushing unit mounts said last named means, rotation of said bushing unit providing for the adjustment of said last named means for precise agreement of its said work engaging surface with the plane of said one end of said cutting edge.

5. A tool for the peripheral reduction of axially fed doweling or like stock, said tool including a head having a central aperture, a plurality of blade holders attached to one face of said head, said holders being peripherally spaced about said aperture, each of said holders having fixed thereto a projected blade, said blades each having an elongated cutting edge differentially sloped from end to end and disposed in an axial sense longitudinally of said head, one end of each of said edges being a trailing end with respect to the order of engagement of said edge with a work piece, said blade edges disposing longitudinally of doweling axially fed through the central aperture of said head and respectively positioning in planes generally radial to the longitudinal axis of the doweling whereby to produce substantially simultaneous cuts generally radial to the doweling to achieve thereby a coextensively equivalent cut of said doweling, with guide means connected to said holders at the exit ends of the cutting edges of said blades to produce a vibration free movement of said stock beyond said head and said blades.

6. A tool as set forth in claim 5, characterized by said guide means being connected by means of eccentrically adjustable pivots to provide for axial adjustment thereof on said blade holders.

No references cited.

WILLIAM W. DYER, JR., *Primary Examiner.*